United States Patent
Lahman et al.

(10) Patent No.: US 8,667,466 B2
(45) Date of Patent: Mar. 4, 2014

(54) PARAMETERIZED INTERFACE IDENTIFIER TECHNIQUES

(75) Inventors: Aaron R. Lahman, Redmond, WA (US); Benjamin Kuhn, Bellevue, WA (US); Lawrence W. Osterman, Woodinville, WA (US); Kenneth W. Sykes, Oakton, VA (US); Hart D. Wilson, Auburn, WA (US); Joaquin Guanter Gonzalbez, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 12/979,618

(22) Filed: Dec. 28, 2010

(65) Prior Publication Data

US 2012/0167049 A1 Jun. 28, 2012

(51) Int. Cl.
*G06F 9/44* (2006.01)

(52) U.S. Cl.
USPC .......................................... 717/123; 717/104

(58) Field of Classification Search
USPC .......................................... 717/104–119, 123
See application file for complete search history.

(56) References Cited

U.S. PATENT DOCUMENTS

| 7,096,465 | B1 | 8/2006 | Dardinski et al. |
| 2002/0004934 | A1 | 1/2002 | Toutonghi et al. |
| 2003/0018833 | A1 | 1/2003 | Guy |
| 2003/0079214 | A1 | 4/2003 | Ghobrial et al. |
| 2004/0073512 | A1 | 4/2004 | Maung |
| 2008/0301702 | A1 | 12/2008 | Gibbs et al. |

OTHER PUBLICATIONS

Finne et al., "Calling hell from heaven and heaven from hell", 1999, ACM, pp. 114-125.*
Dr. Dobbs Journal, "The Component Object Model: Technical Overview", 1996, retrieved from http://www.cs.umd.edu/~pugh/com/, pp. 1-20.*
"International Search Report", Mailed Date: Aug. 31, 2012, Application No. PCT/US2011/067499, Filed Date: Dec. 28, 2011, pp. 9.
Alvarez, Jordi., "Parametric Aspects a Proposal", Retrieved at << http://www.disi.unige.it/person/CazzolaW/RAM-SE04%20Proceedings/Alvarez.pdf >>, In Proceedings of RAM-SE, 2004, pp. 7.
Bernstein, et al., "Microsoft Repository Version 2 and the Open Information Model", Retrieved at << http://citeseerx.ist.psu.edu/viewdoc/download?doi=10.1.1.135.9982&rep=rep1&type=pdf >>, Information Systems—Special issue on meta-modelling and methodology engineering, vol. 24, No. 2, Apr. 1999, pp. 1-27.
Bustamante, Michele Leroux., "Build a Managed BHO and Plug into the Browser", Retrieved at << http://www.15seconds.com/issue/040331.htm >>, Retrieved Date: Oct. 26, 2010, pp. 6.

(Continued)

*Primary Examiner* — Ted T Vo
(74) *Attorney, Agent, or Firm* — Carole Boelitz; Micky Minhas; Wolfe-SBMC

(57) ABSTRACT

Interface identifier parameterization techniques are described. In one or more implementations, a textual description is obtained of a parametric type represented in a binary standard of a programming model and an interface identifier is generated based at least in part on the obtained textual description of the parametric type.

17 Claims, 6 Drawing Sheets

(56) References Cited

OTHER PUBLICATIONS

Sullivan, et al., "Analysis of a Conflict between Aggregation and Interface Negotiation in Microsoft's Component Object Model", Retrieved at << http://ieeexplore.ieee.org/stamp/stamp.jsp?tp=&arnumber=799960 >>, IEEE Transactions on Software Engineering, vol. 25, No. 4, Jul./Aug. 1999, pp. 584-599.

Plášil, et al., "An Architectural View of Distributed Objects and Components in CORBA, Java RMI, and COM/DCOM", Retrieved at << http://d3s.mff.cuni.cz/publications/download/FPLUSOBR.pdf >>, 1998, pp. 1-21.

Stoneman, Elton., "Generating-Deterministic-Guids", Retrieved at << http://geekswithblogs.net/EltonStoneman/archive/2008/06/26/generating-deterministic-guids.aspx >>, Jun. 26, 2008, pp. 6.

* cited by examiner

PARAMETERIZED INTERFACE IDENTIFIER TECHNIQUES

BACKGROUND

Traditional techniques used to identify interfaces in computing languages, e.g., component object model (COM), relied on a programmer to manually create a globally unique identifier (GUID) for each interface. The interface identifier was generally created and implemented such that component may interoperate at a binary level. However, because these traditional techniques relied on the programmer to create the identifier, two programmers would be unable to independently compute the same interface identifier for the same interfaces, leaving them unable to design components that could interoperate with each other.

SUMMARY

Parameterized interface identifier techniques are described. In one or more implementations, a textual description is obtained of a parametric type representing in a binary standard of a programming model and an interface identifier is generated based at least in part on the obtained textual description of the parametric type.

In one or more implementations, a request is received to instantiate an interface. A parameterized interface definition is obtained for the interface that describes a list of parameters of the interface. An interface identifier is assigned to the interface, the interface identifier based at least in part on the list of parameters.

In one or more implementations, one or more computer-readable storage media comprises computer executable instructions that, in response to execution by a computing device, cause the computing device to perform operations comprising automatically generating a textual description based on a definition of a parametric type for an interface in accordance with a component object model (COM), generating a globally unique identifier (GUID) based at least in part on the textual description, and assigning the GUID as an interface identifier for the interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional techniques to code interfaces that supported use at a binary level (e.g., COM and so on) relied upon a programmer to manually generate an identifier that was to be used by each of the interfaces. Accordingly, this caused further complication in coding when multiple programmers desired to work on the same and/or related interfaces.

Techniques are described that relate to interface identifier parameterization techniques. In one or more implementations, these techniques may be used to leverage common design paradigms used by areas like collections and delegates. For example, parametric types may be specified to serve as a basis to express these paradigms while maintaining type safety and promoting ease of use.

For example, in order to express parametric types within COM, a GUID is automatically generated for each parameterized interface. This GUID is then mapped to the interface as it is "flattened" into an operational COM interface. The connection between automatic GUID generation and the expression of parameterized interfaces enables programming languages that are COM-aware to use COM-based parametric types. These techniques are suitable for a wide variety of other languages that rely on binary standards for communication. Accordingly, although COM is given as an example in the following discussion it should be readily apparent that these techniques may be employed by a wide variety of different types of languages, systems, and architectures.

Example Environment

Figure 1:
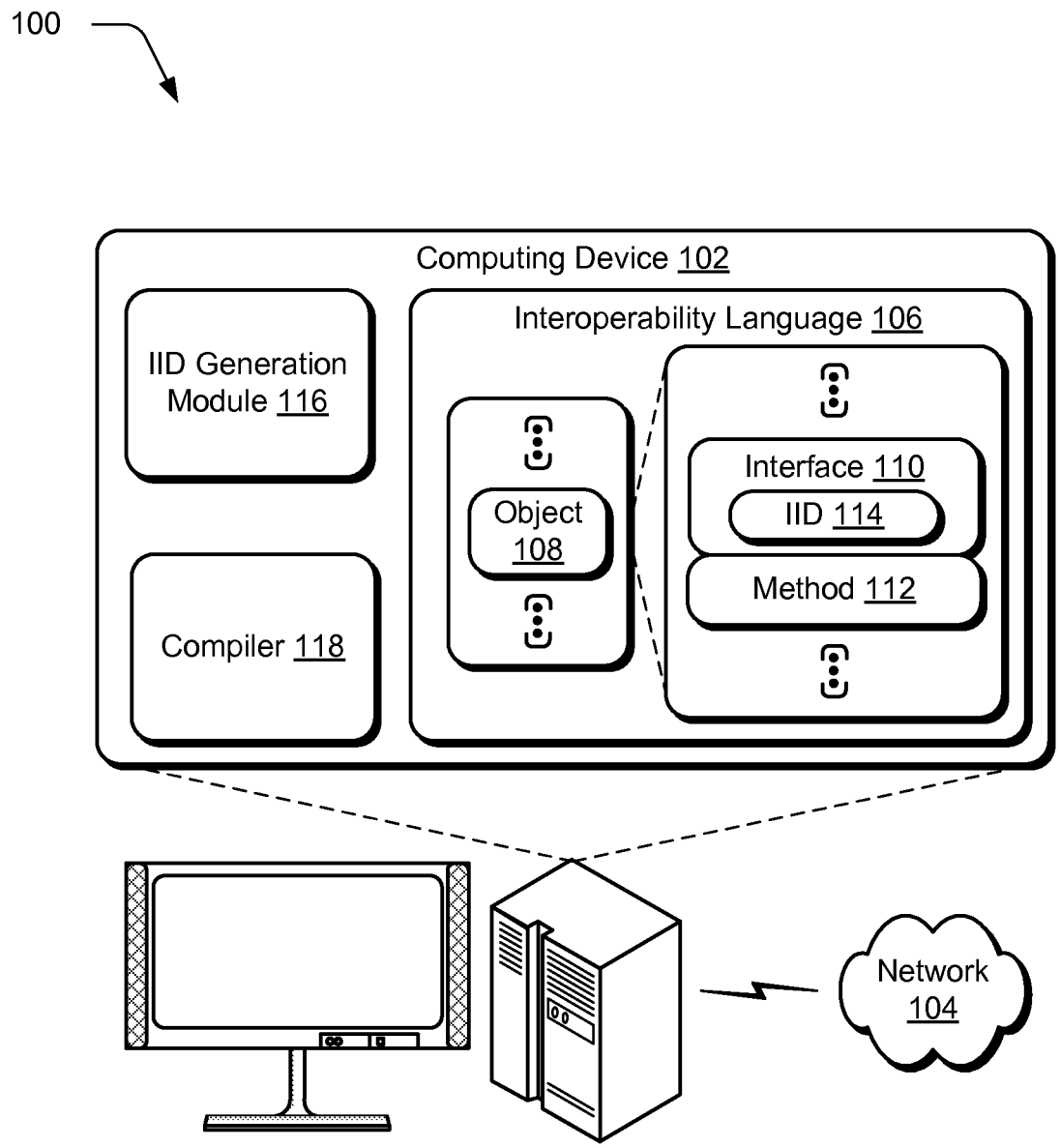
FIG. 1 is an illustration of an environment in an example implementation that is operable to employ parameterization techniques described herein.

FIG. 1 is an illustration of an environment 100 in an example implementation that is operable to employ parameterization techniques described herein. The illustrated environment 100 includes a computing device 102, which may be configured in a variety of ways. For example, the computing device 102 may be configured as a computer that is capable of communicating over a network 104, such as a desktop computer, a mobile station, an entertainment appliance, a set-top box communicatively coupled to a display device, a wireless phone, a game console, and so forth. Additionally, although a single computing device 102 is shown, the computing device 102 may be representative of a plurality of different devices, such as multiple servers utilized by a business to perform operations. Thus, operations described herein may cross machine boundaries.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is a signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 104 is illustrated as the Internet, the network may assume a wide variety of configurations. For example, the network 104 include a wide area network (WAN), a local area network (LAN), a wireless network, a public telephone network, an intranet, and so on. Further, although a single network 104 is shown, the network 104 may be configured to include multiple networks.

The computing device 102 is further illustrated as implementing an interoperability language 106. Interoperability languages 106 may be used to support language neutral techniques for communication, which may include inter-process communication within a computing device 102 itself as well as across machine boundaries, e.g., with another computing device via the network 104. One type of interoperability language involves use of binary interfaces that allow the sharing of data.

For example, the interoperability language 106 may include objects 108 that are reusable in compliance with a component object model (COM) and thus may inherit from other objects, and so on. These objects 108 may provide a wide variety of functionality. To access this functionality, the objects 108 include an interface 110 to interact with methods 112 (i.e., the functionality) of the object 108. Thus, the interface 110 is callable to access the corresponding method 112. Like objects, interfaces may also inherit from other interfaces.

In an example implementation of COM, an interface identifier (IID) 114 of the interface 112 is formed as a globally unique identifier (GUID) having 128 bits, although other implementations are also contemplated. As previously described, however, traditional interface identifiers were manually specified by programmers themselves. Accordingly, coding performed by the programmers that involved use of an interoperability language having such interface identifiers could become complicated in situations where multiple programmers are to work on a same object 108, work on same or different interfaces 110 or methods 112 of that object 108, and so on.

In one or more implementations, parameterization techniques are employed to assign interface identifiers to interfaces, such as interfaces 110 of an object 108 compliant with an interoperability language 106. For example, the parameterization techniques may be employed to assign binary identifiers to work as globally unique identifiers (GUIDs) to uniquely identify interfaces, one from another, using parameters. It may also be used to discover marshalers for interfaces and corresponding methods, and so on.

In one of a variety of examples, a parameterized interface instantiation occurs when a parameterized interface is invoked with an argument list of types in a type context, such as a method parameter position. For example, "HRESULT foo(X<Y>x)" instantiates the parameterized interface named by "X" with the type argument named by "Y". It should be noted that some arguments may not have types. For example, numbers, strings, and other values that verify or constrain arguments or even executable program code that may change various factors relating to how a "flattened" interface definition is to be generated.

Accordingly, an interface identifier (IID) generation module 116 is illustrated in the environment 100 of FIG. 1. The IID generation module 116 is representative of functionality to generate the IID 114 using parameterization techniques. The IID generation module 116, for instance, may operate as part of compiling performed by a compiler 118 to generate the IID 114 according to the parameterization techniques described herein. The IID generation module 116, for instance, may express common design paradigms used by areas such as collection and delegates through the use of parametric types. In this way, type safety and ease of use may be maintained, further discussion of which may be found in relation to the following figure.

Figure 2:
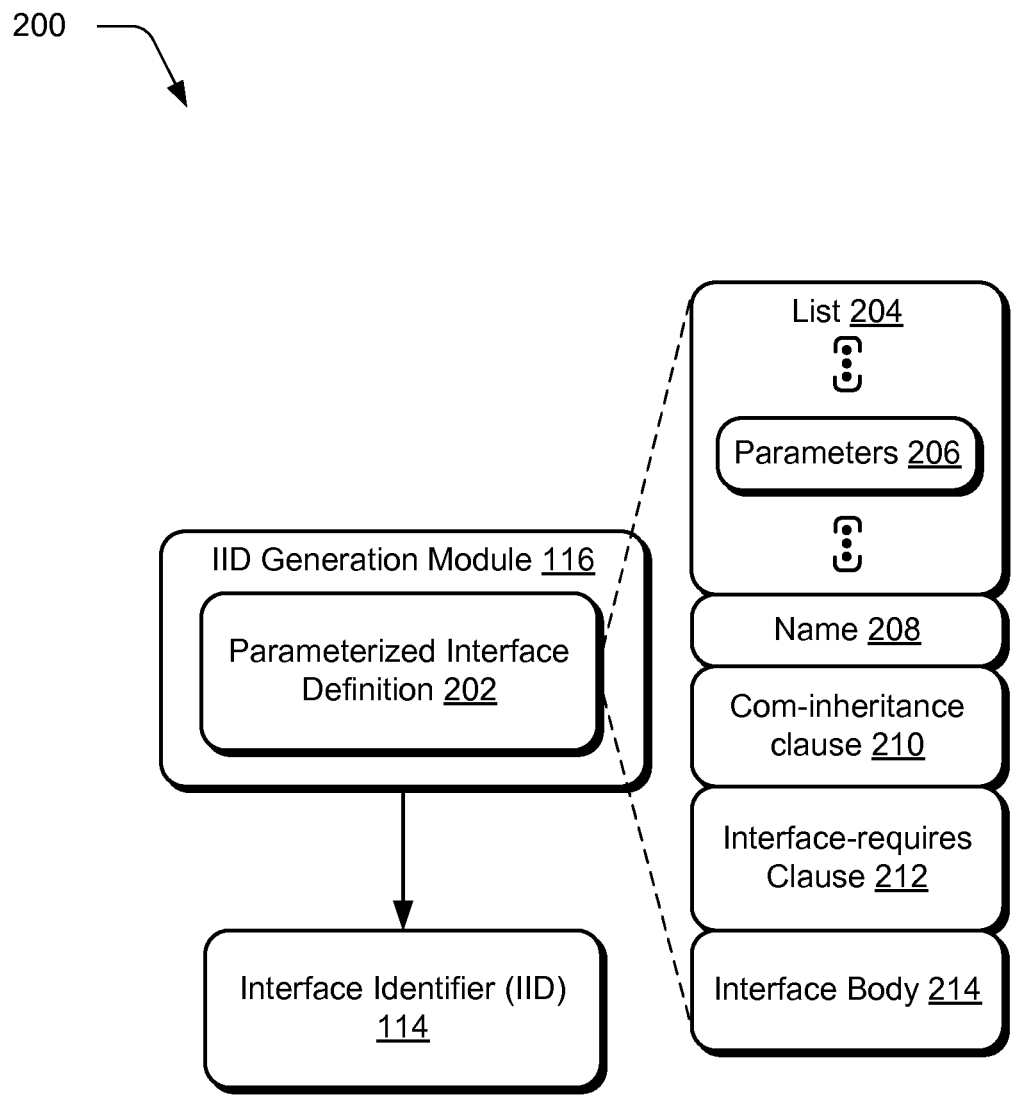
FIG. 2 is an illustration of a system in an example implementation in which an IID generation module of FIG. 1 is shown in greater detail as generating an example IID for an object in compliance with a binary standard of an interoperability language.

FIG. 2 depicts a system 200 in an example implementation in which the IID generation module 116 is shown in greater detail as generating an example IID 114 for an object 108 in an interoperability language 106. In the illustrated example, the IID generation module 116 is illustrated as leveraging a parameterized interface definition 202.

The parameterized interface definition 202, for instance, may specify a list 204 of parameters 206 that may be used as a basis for generating a parameterized interface identifier, which is also referred to as a interface identifier in the following discussion. The parameterized interface definition 202 may also specify a name 208, a com-inheritance clause 210, an optional interface-requires clause 212, and an interface body 214 for the interface. In the com-inheritance clause 210, interface-requires clause 212, and interface body 214, any type context may additionally name types specified by the list 204 in the parameterized interface definition 202, or instantiate other parameterized interfaces with types specified by the list 204 of the parameterized interface definition 202. Further, in one or more implementations the parameterized interface definition 202 may specify an order, in which, the parameters 206 are to be used to create the interface identifier 114, may employ logic (e.g., Boolean connectors), and so on.

When output for consumption is produced in a high-level language (e.g., by IDL), it ensures that the output will fully define each parameterized interface instantiated in that input. For example, if the input instantiates "X<int>" and its output is "foo.h", then a high level language importing "foo.h" is able to implement X<int>. However, if the input does not instantiate X<float>, then it may not be possible for a user of "foo.h" to implement X<float>, rather the user would edit the input to instantiate X<float> as well.

An algorithm employed by the IID generation module 116 may include the following features:
 a) When a parameterized type is instantiated twice with matching arguments, both instantiations are assigned the same interface or delegate body and the same IID 114.
 b) If two different parameterized types are instantiated, even with the same arguments, it is statistically unlikely that both instantiations are assigned the same IID 114.
 c) If a parameterized type is instantiated twice, but with different arguments, it is statistically unlikely that both instantiations are assigned a matching IID 114.

In one or more implementations, a parameterized type is not permitted to be instantiated with the same instantiation as an argument, or as an argument to other parameterized types that may appear in the argument list, i.e., circular instantiation. For example, if X=Foo<Y>, and Y=Foo<X>, non-circularity has been violated. However, if X=Foo<Y> and Y=Foo<int>, non-circularity has been maintained. In other implementations, however, circularity is addressed by the system. Further discussion of parameterization techniques may be found in relation to the following procedures.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

The instructions can be stored in one or more computer readable media. As described above, one such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data. The features of the techniques described below are platform-independent, meaning that the techniques may be implemented on a variety of commercial computing platforms having a variety of hardware configurations.

Example Procedures

The following discussion describes interface identifier parameterization techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
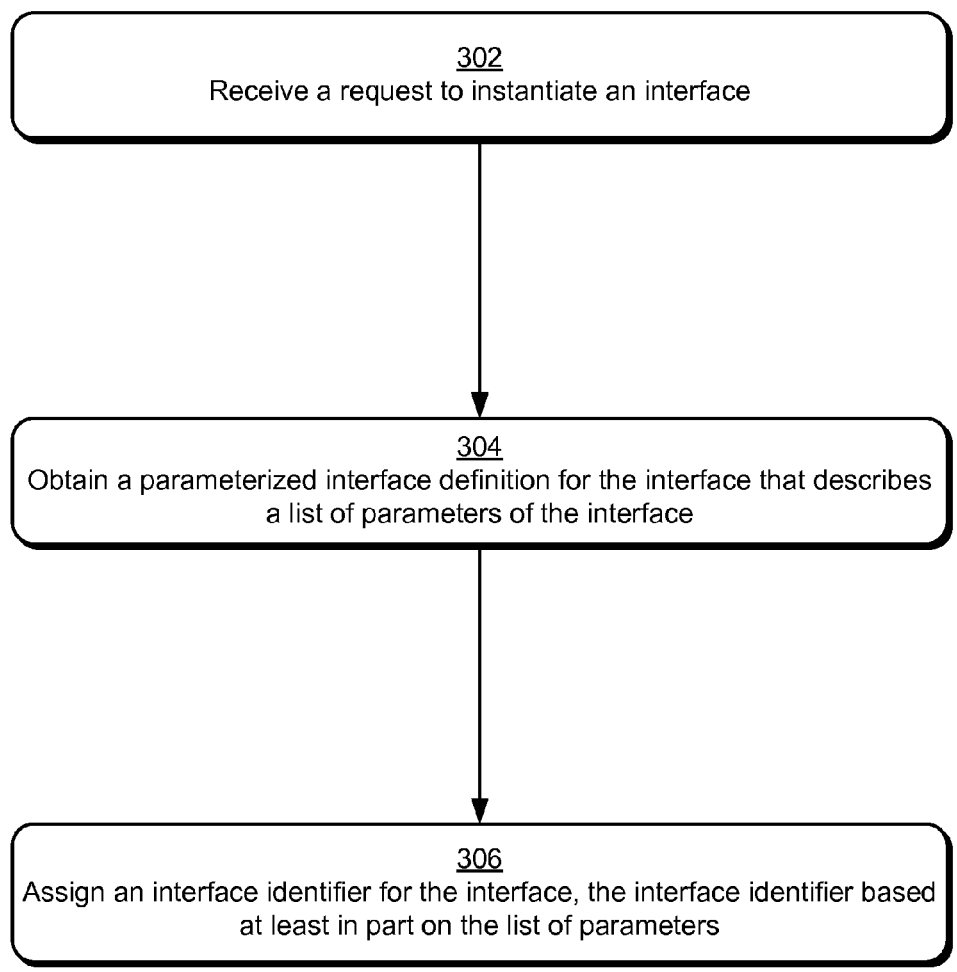
FIG. 3 is a flow diagram depicting a procedure in an example implementation of generating a parameterized interface identifier is shown.

FIG. 3 depicts a procedure 300 in an example implementation in which generating a parameterized interface identifier is shown. A request is received to instantiate an interface (block 302). For example, the request may be received to instantiation a parameterized interface as previously described.

A parameterized interface definition is obtained for the interface that describes a list or parameters of the interface (block 304). The list 204, for instance, may describe parameters 206 that are to be used as a basis for generating the IID, such as parameters relating to the interface being instantiated.

An interface identifier is assigned to the interface, the interface identifier based at least in part on the list of parameters (block 306). In this way, the interface identifier may be generated at least is part based on values for parameters of the interface being identified. A variety of different techniques may be employed, further discussion of which may be found in relation to the following figures.

Figure 4:
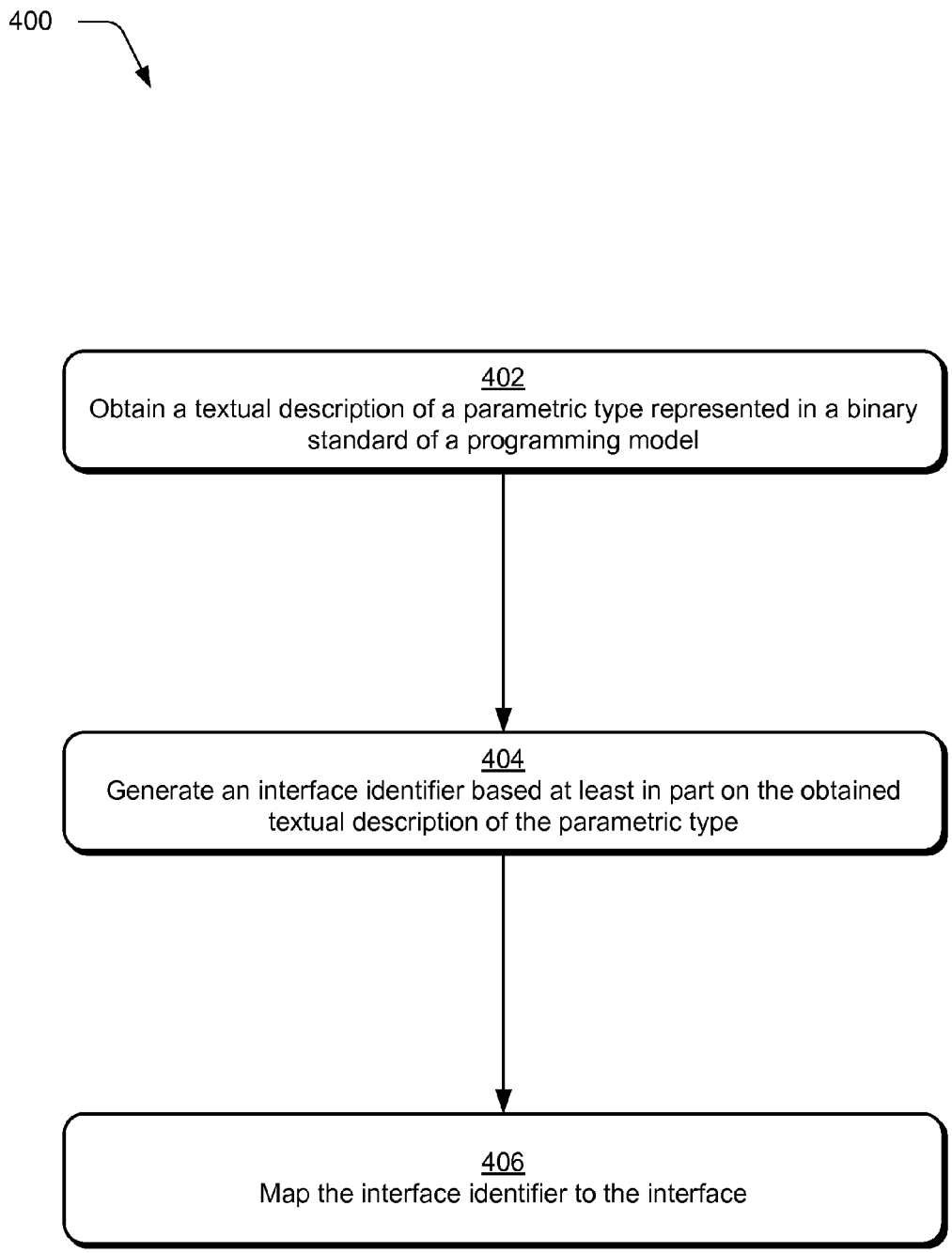
FIG. 4 is a flow diagram depicting a procedure in an example implementation in which an interface identifier in compliance with a binary standard for an interoperability language is generated.

FIG. 4 depicts a procedure 400 in an example implementation in which a textual description of a parametric type is used to generate an interface identifier. A textual description of a parametric type represented in a binary standard of a programming model is obtained (block 402). For example, given a parametric type (e.g., like IVector<int>), a textual description may be automatically generated (e.g., without user intervention) of the parametric type.

An interface identifier is then generated based at least in part on the obtained textual description of the parametric type (block 404). Continuing with the previous example, the interface identifier may then be used for generation of a GUID, thereby "flattening" the parametric type for use in a binary standard, e.g., COM, C++, JAVA, Python, and so on.

The IID is then mapped to the interface (block 406). The connection between automatic GUID generation and the expression of parameterized interfaces enables programming languages that are COM-aware to use COM-based parametric types in this example, although as previously described other binary standards for interoperability languages are also contemplated without departing from the spirit and scope thereof.

Further, generation of the GUID may be performed to automatically follow existing COM IID revision rules. Therefore, when an interface is revised and assigned a new GUID, parameterized instances of that interface may automatically revise corresponding IIDs as well. This allows use of parameterized interfaces to continue even in the presence of multiple revisions of an interface, when two independent parties have a naming collision of an interface (but choose unique IIDs), and so on.

Figure 5:
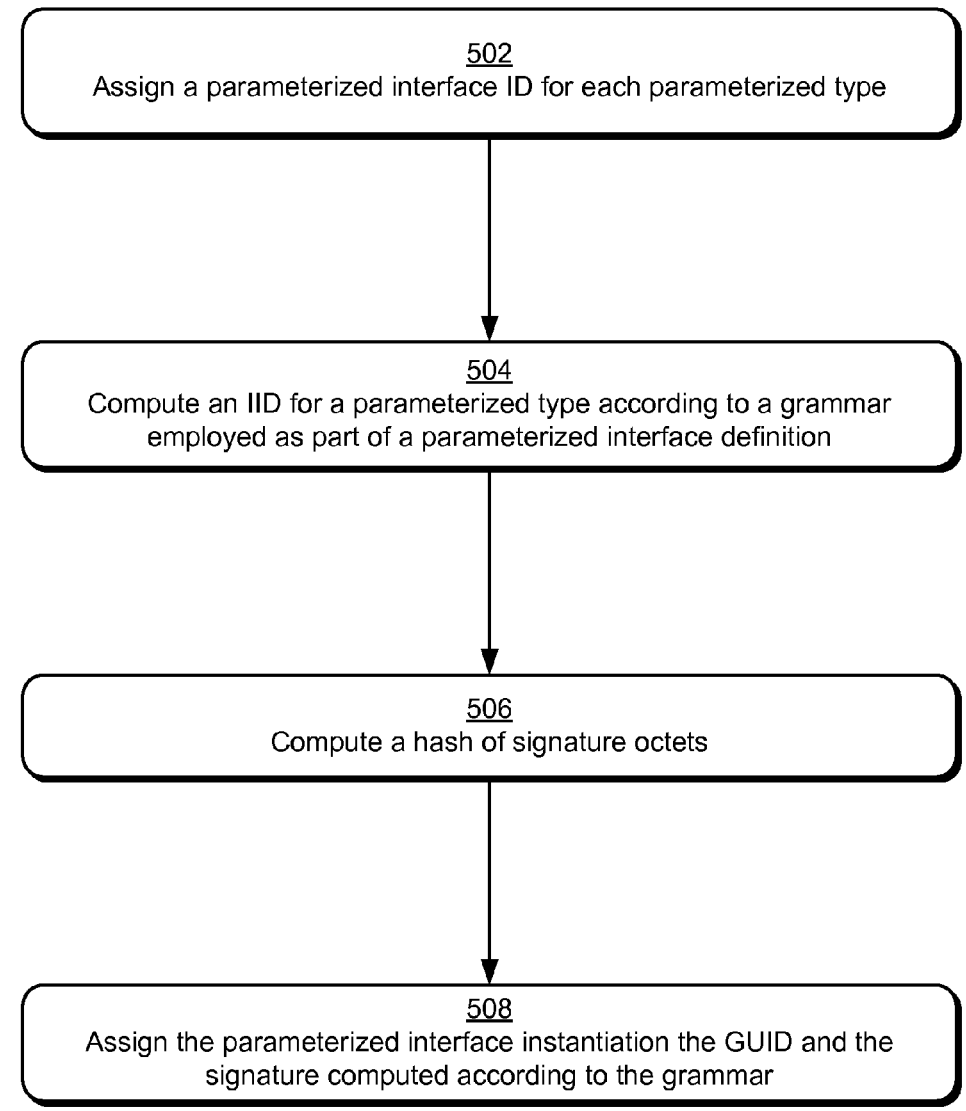
FIG. 5 is a flow diagram depicting a procedure in an example implementation describing an example instantiation algorithm.
Figure 6:
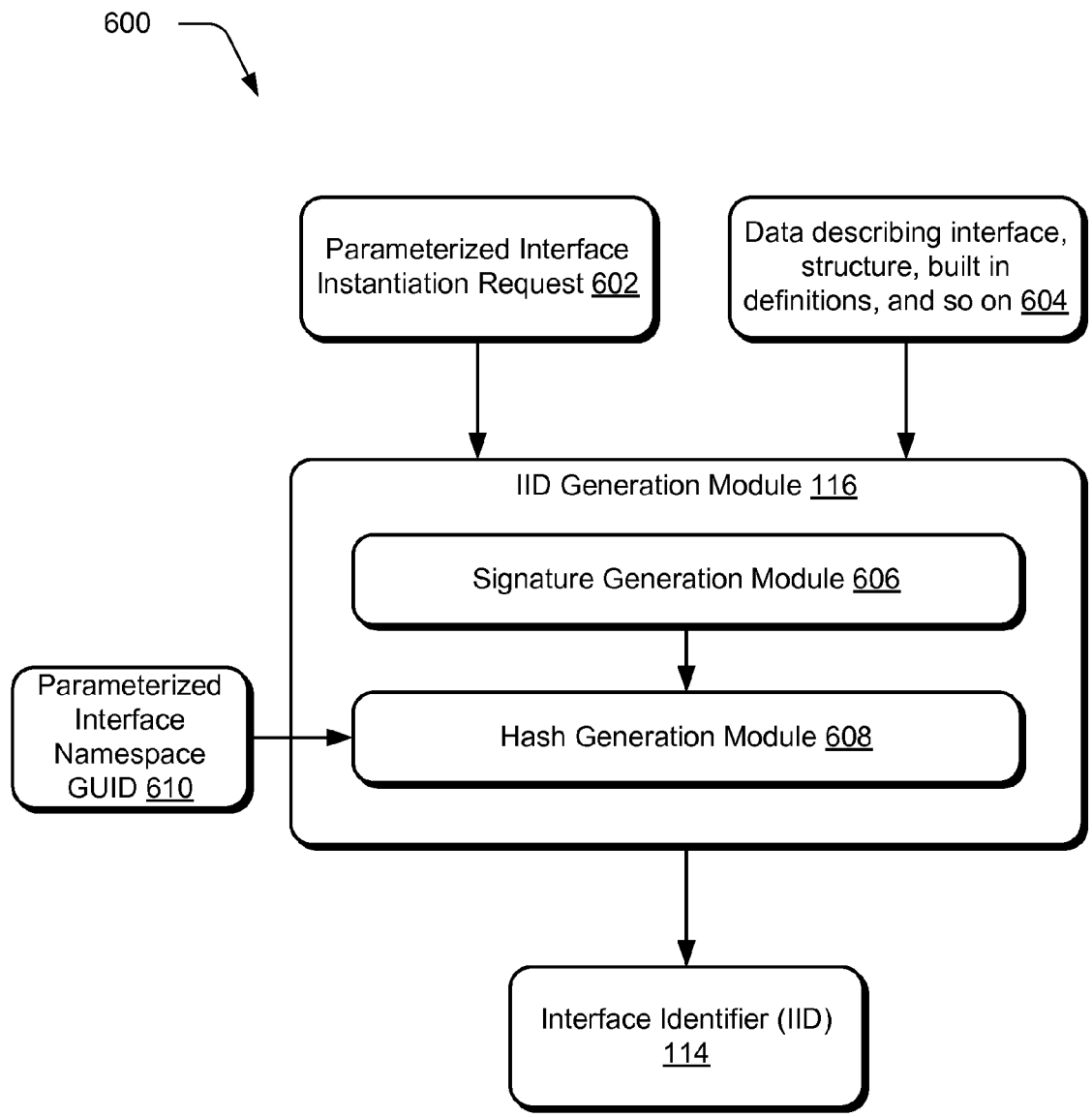
FIG. 6 is an illustration of a system that is operable to perform the procedure of FIG. 4.

FIG. 5 depicts a procedure 500 in an example implementation describing an example instantiation algorithm and FIG. 6 depicts a system 600 that is operable to implement the procedure 500. Accordingly, the following discussion will refer to both figures. Starting with FIG. 6, the IID generation module 116 is illustrated as receiving a parameterized interface instantiation request 602 and data describing interface, structure, built in definitions, and so on 604. Accordingly, the IID generation module 116 may first employ a signature generation module 606 that is representative of functionality to generate a signature that is to be used as a basis for an IID.

For example, each parameterized type may be assigned a parameterized interface ID by its author (block 502), which is abbreviated PIID in the following discussion. It should be noted, PIIDs are not IIDs, are not passed to QI as arguments, and so on.

In one or more implementations, the author is relied upon (e.g., through interaction with a user interface) to ensure that the PIID is unique to that p-type. The type signature for a base type is an ASCII octet string, an example of which is shown in a table appearing bellow. e.g., Int32 is "i4". The type signature for an interface that is not a parameterized interface instance is a respective IID encoded in ASCII in dashed form and surrounded in curly braces, e.g., "{00000000-0000-0000-0000-000000000000}." The type signature for a delegate that is not a p-delegate instance is the string "delegate" and the IID as with interfaces. Detailed grammar follows.

An IID is computed for a parameterized type according to a grammar employed as part of a parameterized interface definition (block 504). For example, a GUID for a parameterized type may be computed according to the following grammar:

- signature_octets => guid_to_octets(wrt_pinterface_namespace) ascii_to_octets(ptype_instance_signature)
- wrt_pinterface_namespace => "11f47ad5-7b73-42c0-abae-878b1e16adee"
- ptype_instance_signature => pinterface_instance_signature |

-continued

- pdelegate_instance_ signature
- pinterface_instance _signature => "pinterface(" piid_guid ";" args ")"
- pdelegate_instance _signature => "pdelegate(" piid_guid ";" args ")"
- piid_guid => guid
- args => arg | arg ";" args
- arg => type_signature
- type_signature => base_type_identifer |
  com_interface_signature | interface _signature |
  delegate_signature | interface_group_signature |
  runtime_class_signature | struct_signature | enum_signature |
  pinterface_instance_signature | pdelegate_instance_signature
- com_interface_signature => "cinterface(IInspectable)"
- base_type_identifier is defined bellow
- interface_signature => guid
- interface_group_signature => "ig(" interface_group_name ";" default_interface ")"
- runtime_class_signature => "rc(" runtime_class_name ";" default_interface ")"
- default_interface => type_signature
- struct_signature => "struct(" struct_name ";" args ")"
- enum_signature => "enum(" enum_name ";" enum_underlying_type ")"
- enum_underlying_type => type_signature
- delegate_signature => "delegate(" guid ")"
- guid => "{" dashed_hex "}"
- dashed_hex is the format uuidgen writes in when passed no arguments:
- dashed_hex => hex{8} "-" hex{4} "-" hex{4} "-" hex{4} "-" hex{12}
- hex => [0-9a-f]

Next, a hash is computed of signature octets (block 506). For example, a Ver. 5 sha-1 generated hash of signature$_{13}$ octets may be computed according to UUID RFC 4122. In this example, the hash generation module 608 uses a single winrt pinterface/pintergroup GUID 610 as the namespace as described in RFC 4122/4.3, and the signature of the pinterface/pintergroup and the arguments it is instantiated with as received by the signature generation module 606 as the name string.

The parameterized interface instantiation is assigned the GUID and the signature computed according to the grammar (block 508). For example, the IID generation module 116 may map the value computed by the hash generation module 608 to a corresponding interface. Therefore, when a p-type instantiation is passed as an argument to another parameterized interface, the signature computed according to the type signature is used as the type signature in grammar element 'pinterface_instance_signature' or 'pdelegate_instance_signature', as appropriate.

The following names may be used for base types when encountered:

| | | |
|---|---|---|
| UInt8 | maps to | "u1" |
| Int32 | maps to | "i4" |
| UInt | maps to | "u4" |
| Int64 | maps to | "i8" |
| UInt64 | maps to | "u8" |
| Single | maps to | "f4" |
| Double | maps to | "f8" |
| Boolean | maps to | "b1" |
| Char16 | maps to | "c2" |
| String | maps to | "string" |
| Guid | maps to | "g16" |

In an implementation, the above names are case sensitive. Other than for string, the type name uses a single character to suggest the kind of data, followed by its size in bytes. These example names may be chosen to be concise (e.g., to avoid large sizes in struct type signatures), so as not to appear confusingly similar to either the WinRT name, RIDL name, or language projection name for any type, and still remain human readable.

Further, in one or more implementations for enum_type_signature, the nexted type_signature is the base type of the enum. For struct_type_signature, args is an in-order list of type_signatures for the fields of the struct. Struct_name and enum_name may be namespace qualified, using period "." as delimiters, e.g., "namespace X {struct A{int;};}" becomes "struct(X.A;i4)".

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
   obtaining a description of a parametric type represented in a binary standard of a programming model; and
   generating an interface identifier based at least in part on the obtained description of the parametric type, the generating performed to automatically follow revision rules such that when a revision is made to an interface the description that is used as a basis to generate the interface identifier is revised automatically.

2. A method as described in claim 1, wherein the binary standard is configured according to a component object model (COM).

3. A method as described in claim 1, wherein the description is a textual description or a binary metadata representation of the parametric type.

4. A method as described in claim 1, wherein the binary standard specifies a structure for compiling by the computing device and how objects are to be organized in memory of the computing device.

5. A method as described in claim 1, wherein the generating of the interface identifier is not performed during runtime.

6. A method as described in claim 1, wherein the generating of the interface identifier is performed using a parameterized interface definition that includes a list of parameters to be used to generate the interface identifier.

7. A method as described in claim 1, wherein the generating includes computing a type signature for a corresponding interface and a hash from the type signature.

8. A method as described in claim 1, wherein the generating employs an algorithm that is operable such that when a parameterized type is instantiated twice with matching arguments, both instantiations are assigned a matching interface and a matching interface identifier.

9. A method as described in claim 1, wherein the generating employs an algorithm that is operable such that if two different parameterized types are instantiated with matching arguments, it is statistically unlikely that both instantiations are assigned matching interface identifiers.

10. A method as described in claim 1, wherein the generating employs an algorithm that is operable such that if a parameterized type is instantiated twice with different arguments, it is statistically unlikely that both instantiations are assigned matching interface identifiers.

11. A method as described in claim 1, wherein the interface identifier is generated by employing an algorithm that is operable such that:
   when a parameterized type is instantiated twice with matching arguments, both instantiations are assigned a matching interface and a matching interface identifier;

if two different parameterized types are instantiated with matching arguments, it is statistically unlikely that both instantiations are assigned matching interface identifiers; and if a parameterized type is instantiated twice with different arguments, it is statistically unlikely that both instantiations are assigned matching interface identifiers.

12. A method implemented by one or more computing devices, the method comprising:

receiving a request to instantiate an interface;

obtaining a parameterized interface definition for the interface that describes a list of parameters of the interface; and generating an interface identifier for the interface, the interface identifier generated based at least in part on the list of parameters and by employing an algorithm that is operable such that:

when a parameterized type is instantiated twice with matching arguments, both instantiations are assigned a matching interface and a matching interface identifier;

if two different parameterized types are instantiated with matching arguments, it is statistically unlikely that both instantiations are assigned matching interface identifiers; or if a parameterized type is instantiated twice with different arguments, it is statistically unlikely that both instantiations are assigned matching interface identifiers.

13. A method as described in claim 12, wherein the parameterized interface definition also describes a name for the interface, an inheritance clause, and an interface body.

14. A method as described in claim 12, wherein the interface identifier is generated to automatically follow revision rules such that when a revision is made to the interface the interface identifier is revised automatically.

15. A method as described in claim 12, wherein the interface identifier is generated before compiling.

16. One or more computer-readable storage media comprising computer executable instructions that, in response to execution by a computing device, cause the computing device to perform operations comprising:

automatically generating a textual description based on a definition of a parametric type for an interface in accordance with a component object model (COM), the generating performed to automatically follow revision rules of the COM such that when a revision is made to the interface the textual description that is used as a basis to generate the GUID is revised automatically;

generating a globally unique identifier (GUID) based at least in part on the textual description; and assigning the GUID as an interface identifier for the interface.

17. One or more computer-readable storage media as described in claim 16, wherein the generating is performed as part of compiling.

* * * * *